(12) United States Patent
Benedek et al.

(10) Patent No.: US 12,589,789 B2
(45) Date of Patent: Mar. 31, 2026

(54) MOBILE PLATFORM AND METHOD OF ASSEMBLY THEREOF

(71) Applicant: BENEDEX LTD, Bristol (GB)

(72) Inventors: Snir Zeev Benedek, Bristol (GB);
Thomas James Finch, Bristol (GB)

(73) Assignee: BENEDEX LTD, Bristol (GB)

( * ) Notice: Subject to any disclaimer, the term of this patent is extended or adjusted under 35 U.S.C. 154(b) by 287 days.

(21) Appl. No.: 18/234,292

(22) Filed: Aug. 15, 2023

(65) Prior Publication Data

US 2025/0058812 A1     Feb. 20, 2025

(51) Int. Cl.
  B62D 21/00     (2006.01)
  B62B 3/04     (2006.01)
  B62B 5/00     (2006.01)
(52) U.S. Cl.
  CPC ............... B62B 5/004 (2013.01); B62B 3/04 (2013.01); *B62B 2501/04* (2013.01)
(58) Field of Classification Search
  CPC ....... B62B 5/004; B62B 3/04; B62B 2501/04; B62D 27/023; B62D 63/025; B62D 21/00; B60K 2007/0092; B60K 7/0007
  See application file for complete search history.

(56) References Cited

U.S. PATENT DOCUMENTS 5,482,125 A     1/1996  Pagett
7,281,600 B2 *  10/2007  Chernoff ................ B62D 21/07
                                          180/58

2005/0236217 A1   10/2005  Koelin et al.
2009/0308671 A1   12/2009  Kim et al.
2013/0325239 A1   12/2013  Ozaki
2018/0072212 A1    3/2018  Alfaro et al.
2021/0237554 A1*   8/2021  Bangalore Srinivas .....................
                                                  B60K 17/356

FOREIGN PATENT DOCUMENTS

CN         106409125  A  *  2/2017  ............. G09B 25/02
CN         111776108  A     10/2020
CN         112389979  A      2/2021
CN         218431488  U  *   2/2023
GB          2596185   A     12/2021
GB          2605491   A     10/2022
WO       2012153596  A1     11/2012
WO    WO-2020259833  A1  *  12/2020  ........... B60K 7/0007

* cited by examiner

*Primary Examiner* — Justin Holmes
(74) *Attorney, Agent, or Firm* — Smartpat PLC

(57)     ABSTRACT

A mobile platform for an autonomous mobile robot comprises an external structural frame extending around the periphery of the platform. A wheel set comprises a plurality of wheel units each coupled to the frame. At least one wheel includes an in-hub electric motor. A central unit conforms to the internal form of the structural frame and has a substantially planar form. The central module includes a power source and a controller. A method of assembling a mobile platform for an autonomous mobile robot comprises the steps of: constructing a peripheral structural frame; providing a central unit configured to conform to the internal form of the structural frame, the central module comprising a power source and a controller; and mounting a wheel set to the frame the wheel set comprising a plurality of wheel units, each coupled to the frame and at least one wheel including an in-hub electric motor.

13 Claims, 6 Drawing Sheets

FIG. 1A
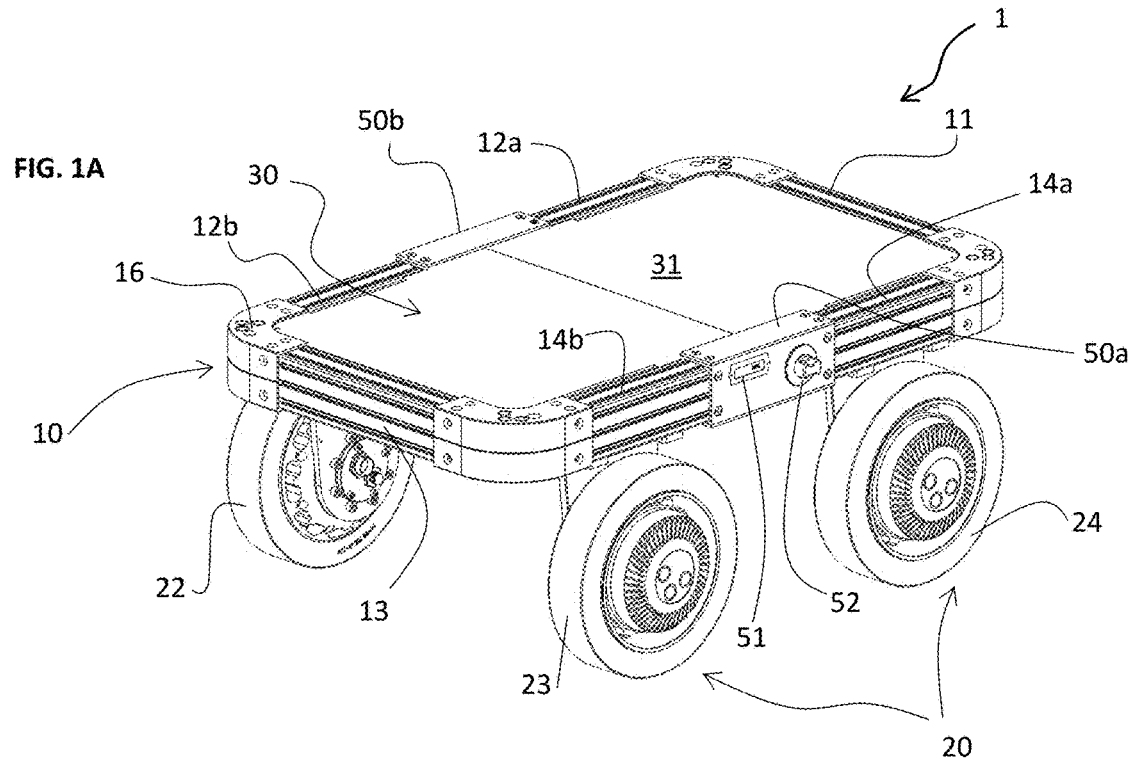
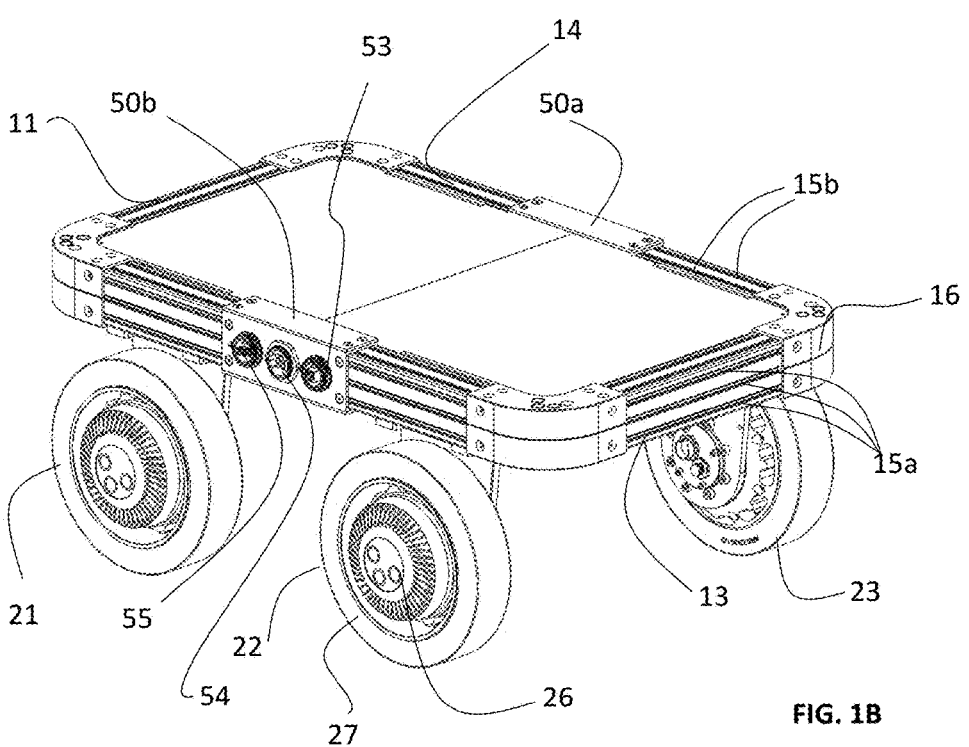
FIG. 1B

600

MOBILE PLATFORM AND METHOD OF ASSEMBLY THEREOF

TECHNICAL FIELD

The present disclosure relates to mobile platforms for autonomous mobile robots and to a method of assembling mobile platforms for autonomous mobile robots.

BACKGROUND

Automation makes industry more productive and leaner. Automation technology is evolving, adopting an increasingly distributed modular nature utilising numerous smaller functional units, rather than giant multi-capable machines. Autonomous Mobile Robots ("AMRs") are examples of this evolution, flourishing, as their functionality improves, in logistics, agriculture, manufacturing, retail, healthcare and more. According to all market research groups, AMR is one of the fastest growing sectors in robotics today. It will be appreciated that there is no clearly fixed definition of what constitutes an AMR and can include neighbouring and/or overlapping classifications such as and Autonomous Guided Vehicles ("AGVs"). For consistency and clarity autonomous mobile robot is used as a general term herein and should be interpreted broadly.

The subsystems of AMRs may be divided into two main subcategories. Firstly there is payload, which does the work and may for example include a picker or manipulator and the like. Secondly there is the mobile platform (which may also be referred to as a "mobile base" but mobile platform is used exclusively herein for consistency and clarity), which supports and moves the payload around as required. Though the payload in every AMR is specialised for its tasks, the mobile platform broadly just needs to meet a required payload weight/dimensions and to be reliable and efficient. With the rapid growth in adoption of AMRs, many companies lack the expertise to develop hardware themselves and must select a compromise between investing significant cost, time and money into developing a custom mobile platform or utilise an off-the-shelf solution which is often overly generic and ill-suited to accommodate the payload diversity across AMRs.

Accordingly, the applicant has identified a need for an AMR mobile platform which can provide users with a configuration which can be easily and quickly adapted to meet specific needs. In this regard the applicant has proposed a drive system which can be quickly adapted to a variety of platforms in their published UK patent application GB2596185A, published 22 Dec. 2021 (the contents of which is hereby incorporated by reference).

The applicant has now recognised that there is a growing need for an AMR platform and method of producing custom AMRs which provides similar benefits of providing rapidly customised solutions. Such a platform may, for example, be used in conjunction with the drive system of GB2596185A. In particular it would be advantageous to provide a platform which can provide an "off-the-shelf" solution in a broad range of configurations which may make the development of robotic and/or autonomous vehicles simpler, faster, and cheaper, aiming to reduce time to market and improve quality.

SUMMARY

According to a first aspect of the invention, there is provided a mobile platform for an autonomous mobile robot, the platform comprising:

an external structural frame extending around the periphery of the platform;

a wheel set comprising a plurality of wheel units each coupled to the frame and at least one wheel including an in-hub electric motor;

a central unit configured to conform to the internal form of the structural frame and having a substantially planar form, the central unit comprising at least a power source and a controller.

The in-hub electric motor may be a direct drive motor.

The central unit or module may comprise upper and lower cover plates. The cover plates and frame may form a sealed unit (for example sealed against the ingress of water and/or dust). At least one, and in some embodiments both, cover plate may extend parallel to a surface of the external structural frame. For example, the cover(s) may be parallel to either of the upper and lower surface of the structural frame. At least one of the cover plates may be co-planar with a surface of the external structural frame. In some embodiments the cover plates may each be co-planar with respective upper and lower surfaces of the structural frame. Accordingly, the central unit may be configured such that it is volumetrically confined within a space defined by the structural frame. In this manner, the structural frame may in effect provide an exoskeletal chassis. The external structural frame and upper and lower cover plates may collectively define the outer body of the platform. The upper and lower cover plates may enclose the space defined within the interior of the structural frame. In some embodiments structural connectors may be provided which extend between the upper and lower cover plates through the interior of the structural frame. Such structural connectors may brace between the cover plates to enable the plates to act as a sandwich structure. This may for example be used to optimise the rigidity of the mobile platform and, for example, to increase the platforms resistance to shear forces.

The structural frame may be sufficiently rigid and strong to carry the primary static and dynamic loads required of the mobile platform. The covers may, for example, provide additional rigidity to the frame (which may for example help resist deformation) but the weight bearing of the mobile platform may be via the structural frame. The structural frame may be a generally planar structure (for example defined by a single aligned layer of structural beams) which defines a closed shape extending fully around the periphery of the platform. The structural frame has a substantially uniform cross section along its length. The structural frame may define an open central region (into which the central unit is mounted). The structural frame may be defined by elongate beams extending between corner connectors or joints. The elongate beams may be generally linear such that the frame is a polygonal shape. The frame may for example comprise a generally rectangular frame The joints or connectors may each comprise a bracket for receiving adjacent ends of elongate beams, for example perpendicular ends at a corner. The elongate beams may be extruded sections. The elongate beams may have a constant cross section (and may for example have a rectangular outer profile). The beams may be formed with at least one longitudinal groove (i.e., a groove formed in the surface of the beam and extending longitudinally along the length of the beam). At least one longitudinal groove may be provided on each side surface of the beam, and in some embodiments each side surface may include a plurality of parallel longitudinal grooves. The beams may for example be formed of extruded metal, for example aluminium. The, or each, longitudinal groove may be undercut (for example defining a flange along the groove at the surface of the beam). The undercut may be used to secure fasteners, for example, T-nuts, to the beam.

Each wheel unit may be connected to the structural frame via at least one longitudinal groove. For stability and robustness, each wheel unit may be connected to a plurality of longitudinal grooves in the structural frame. Longitudinal grooves, particularly those in the upper most surfaces of the structural frame, may provide mounting rails for the autonomous mobile robot payload. The longitudinal grooves may have additional functional uses. In some embodiments electrical elements such as sensors or emitters could be located in the grooves. For example, lights, such as LED strips, could be mounted into portions of the grooves (for example to provide status indication).

In some embodiments additional elongate payload support beams may be mounted to the structural frame. The payload support beams may extend transversely and for example across the central unit. The payload support beams may be mounted to an upper surface of the structural unit such that they span the central unit (thus, it will be appreciated that the payload need not be supported by the central unit and rather is directly supported by the structural frame via the beams).

The central unit may further comprise a thermal management system (which may for example comprise a source of cooling air for the controller, power source and/or electric motor). The controller may for example include sensors and/or a wireless communications link. The controller may include one or more connection ports, for example a port for an input device such as a joystick controller.

The power source may comprise a plurality of batteries.

One or more connection ports for power and/or data may be provided at the exterior of the central unit. For example, at least one charging port may be provided. Additionally or alternatively, a communications port for connection to a computer or the like may be provided. Connection ports may also be provided for the payload for example to provide power and/or communication connections to the modules to be mounted to the platform. As such the mobile platform power source could also be used as a power source for the payload.

The controller may be a centralised control providing centralised communication across all functional units. For example, a centralised electrical and electronics system may provide a simplified connection architecture. The electrical systems may be designed to utilise common wiring harnesses to reduce the number of connections and/or provide a more modular layout which can be easily configured and/or scaled for different requirements. The use of consolidated systems may also provide ease of software updates through common computer systems. In some embodiments the mobile platform may include a plurality of optional modules which are connectable to the controller via the centralised electrical and electronics system. For example, a communications bus, which may be a common communications bus, may be provided into which modules can be selectively connected during manufacture or assembly.

It may be appreciated that embodiments of the invention provide a modular system which can provide mobile platforms for autonomous mobile robot in a variety of configurations. For example, the planform of each platform may be defined in respect of its width and length and a structural frame assembled by selecting suitably sized beam sections. The central unit may then be assembled within the size constraint of the frame (and for example the number and/or size of batteries scaled up or down depending upon the available space, for example the number of cells in the, or each, battery could be selected based upon the available space). The planform of the platform may, for example, be defined by payload requirements or related specification, for example in some embodiments the specification may determine a minimum battery size resulting in a certain configuration of the frame. Wheels of a suitable type and or configuration may then be selected and connected to the frame. For example, the number of wheels having in-hub motors may be selected based upon the load required for a given application. A payload may then be affixed to the frame as required.

According to a further aspect of the invention there is provided a method of assembling a mobile platform for an autonomous mobile robot. The method may comprise the steps of:

constructing a peripheral structural frame;

providing a central unit configured to conform to the internal form of the structural frame and having a substantially planar form, the central unit comprising at least a power source and a controller;

mounting a wheel set to the frame the wheel set comprising a plurality of wheel units each coupled to the frame and at least one wheel including an in-hub electric motor.

The step of constructing a peripheral structural frame may comprise building a rectangular frame from elongate beams extending between corner joints. The frame may be built from extruded beams having integral connecting features. The step of constructing a peripheral structural frame may comprise structurally coupling a pair of transverse beams and a pair of longitudinal beams to form a rectangular frame.

The step of providing a central unit may comprise providing a pair of spaced apart upper and lower covers enclosing the internal space within the structural frame.

The method may comprise defining the dimensions of the mobile platform by selecting the length of the beams.

The method may comprise selecting the number of driven wheels to provide a required maximum drive force, and/or meet a required maximum load and/or meet a specific steering topology.

The method may comprise connecting a payload to the frame. For example, the method may comprise connecting a payload using grooves formed in the frame.

Whilst the invention has been described above, it extends to any inventive combination of the features set out above or in the following description or drawings.

BRIEF DESCRIPTION OF THE DRAWINGS

Embodiments of the invention may be performed in various ways, and embodiments thereof will now be described by way of example only, reference being made to the accompanying drawings, in which:

FIGS. 1A and 1B show three-dimensional schematic representation of a mobile platform for an autonomous mobile robot in accordance with an embodiment of the present disclosure;

DETAILED DESCRIPTION

Figure 2A:
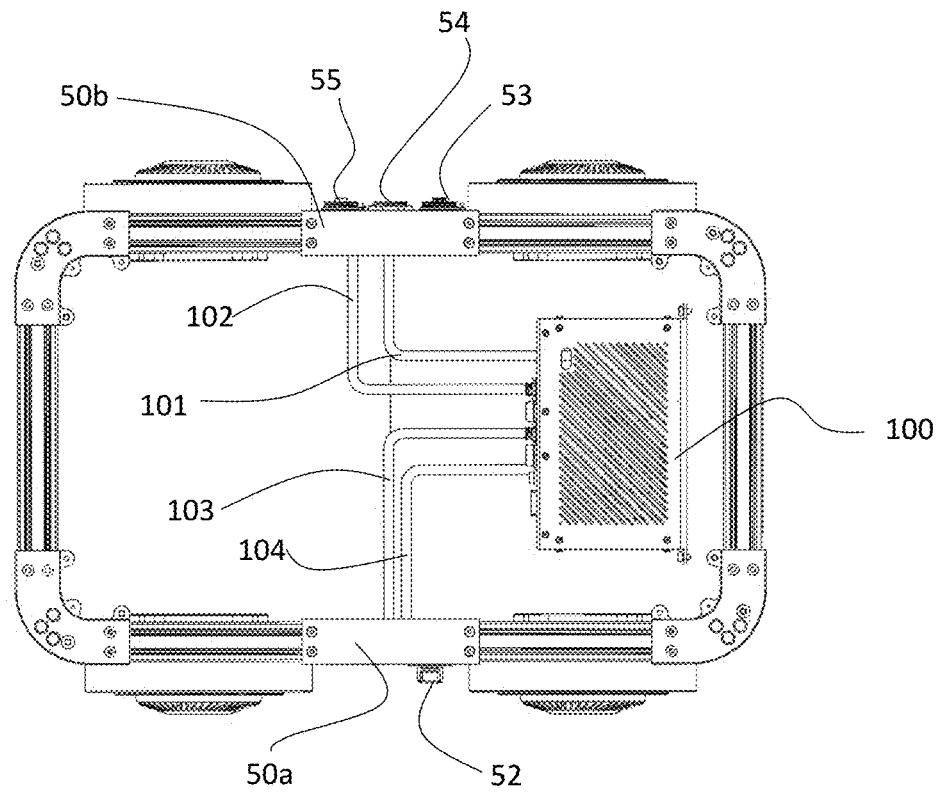
FIGS. 2A and 2B show internal details of the mobile platform of FIG. 1.

A mobile platform 1, for use in an autonomous mobile robot, in accordance with embodiments of the invention is shown schematically in FIGS. 1 and 2. The platform is structurally defined by an external structural frame 10 extending around the periphery of the platform. A wheel set 20 comprises a plurality of wheel units 21, 22, 23, 24 each coupled to the frame 10. At least one of the wheel units 21, 22, 23, 24 may include a direct drive electric motor within its hub (and in the example of FIGS. 1 and 2 all the wheels have a motor). A central unit 30 is sized and shaped to conform to the internal form of the structural frame 10. The central unit 30 has a substantially planar form and comprises at least a power source and a controller. The structural frame 10 provides a rigid load bearing chassis for the mobile platform. As will be explained further below, the other components of the autonomous mobile robot are all connected and supported through the structural frame 10. As such, the platform provides a highly flexible system which can be easily customised and configured to particular needs in a modular manner.

The structural frame 10 comprises a rectangular frame formed from extruded aluminium beams 11, 12, 13, 14. Front and rear beams 11 and 13 are parallel, extend transversely and are longitudinally spaced apart. Side beams 12 and 14 are parallel, extend longitudinally and are transversely spaced apart. Each beam has a constant rectangular cross section and includes longitudinal grooves 15.

The groves 15 have an undercut profile and define attachment rails extending along the length of the beams. In the illustrated example, the beams have a profile having two parallel grooves 15a on each side face and three parallel grooves 15b in the upper and lower faces. Beam profiles having more or less grooves could be used in other embodiments.

Figure 5:
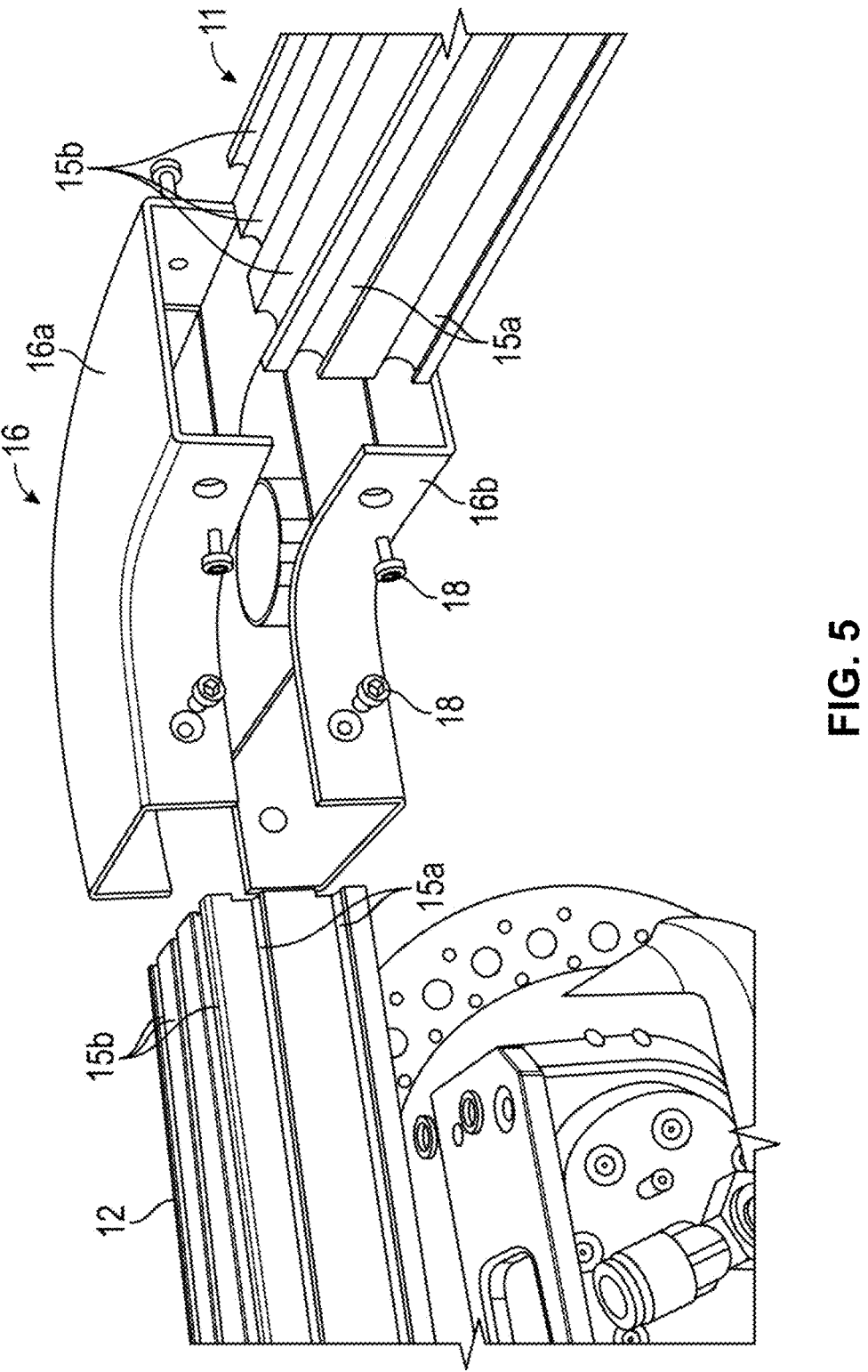
FIG. 5 shows an exploded detail of a platform in accordance with an embodiment and FIG. 6 shows a schematic flow chart of a method in accordance with an embodiment
Figure 6:
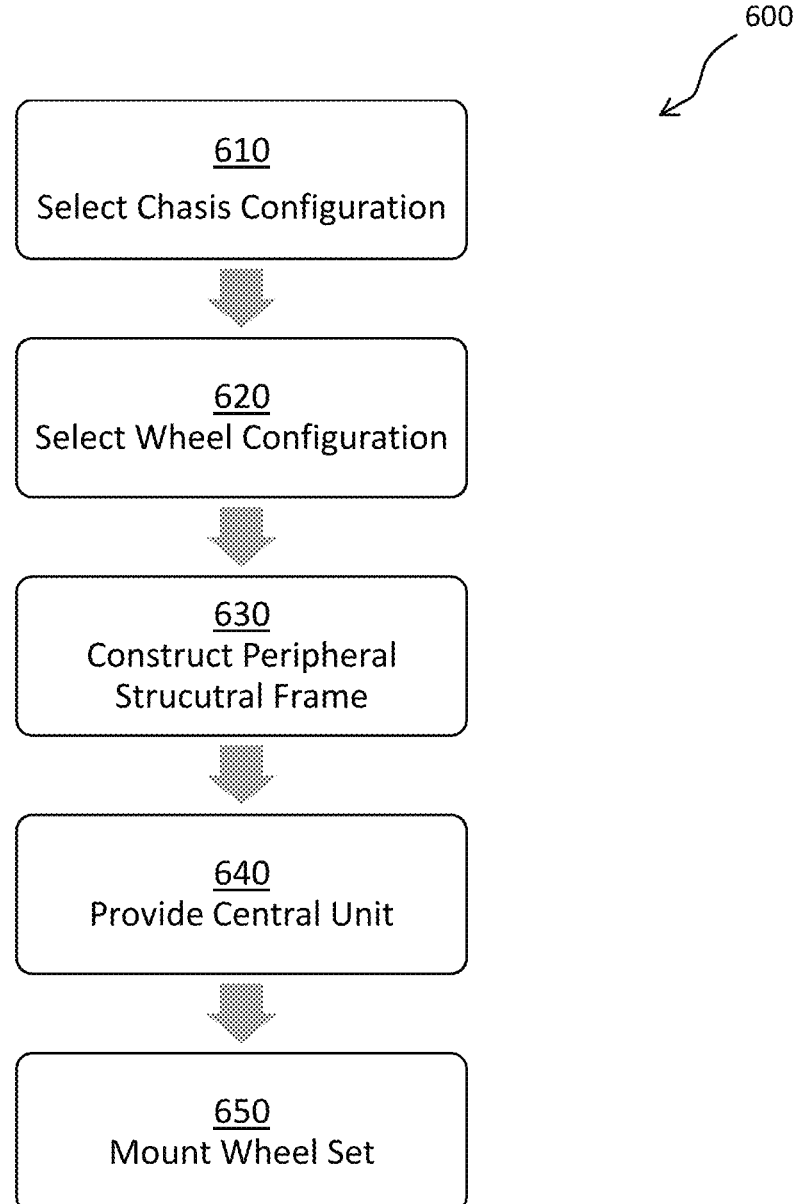

A right-angle connecting bracket 16 is provided at each corner of the structural frame 10 to connect the ends of the beams 11, 12, 13, 14. A detailed view of the connecting bracket 16 is shown in FIG. 5 in which it can be seen that in this example the bracket is formed of upper and lower bracket portions 16a and 16b and which each define a portion of a respective seat for receiving and supporting the end of the beam 11, 12. Once positioned in the bracket 16, the beam can be secured using a series of fasteners 18 which engage the grooves 15a in the side wall of the beam (and in other embodiments fasteners could alternatively or additionally engage the grooves 15b in the top or bottom surfaces). It will be appreciated that in other embodiments the beams may be connected by other means such as by an internal connector or welding or bonding. It may be noted that some of the beams (in this example side beams 12 and 14) comprise separate beam sections connected via an interface 50 (which is explained in further below). Thus, the interface 50 may be a connector between adjacent ends of a beam section.

The wheel set 20 is connected directly to the structural frame 10. In particular, each wheel 21, 22, 23, 24 can be mounted to at least one of the beams (for example the side beams 12, 14) using the mounting rails defined by the grooves 15. In some configurations it will be appreciated that each wheel could be connected to multiple beams (for example by being mounted in the corner of the structural frame. By individually mounting the wheels in this manner it will be appreciated that the position of each wheel is highly flexible. For example, the longitudinal spacing between wheels can be adjusted to provide a wheelbase which provides optimum stability or manoeuvrability and depending upon the centre of mass of the payload of the autonomous mobile robot. This may be particularly advantageous in combination with the applicants co-pending UK patent application GB2596185A (published 22 Dec. 2021) which can provide a control system which can be easily reconfigured depending upon the selected wheel configuration.

At least some of the wheels (and in the example of FIGS. 1 and 2 all four wheels 21, 22, 23 and 24) include in-hub direct drive motors. The provision of a wheel unit having an in-hub electric motor (which is preferably a direct drive motor) removes the need for transmission arrangements between separate wheels or between the body of the platform and the wheel and helps allow a flexible platform in which only the connection to the frame 10 defines or constrains the configuration. The direct driven wheel unit of embodiments comprises a stator portion 26 including the wheel hub and a surrounding rotor portion 27 including the rolling surface of the wheel (for example a tyre). A mount 28 is connected to the stator 26 and is connected to the frame 10 via a connector 25 (as shown for example in FIG. 5).

The autonomous mobile robot payload (not shown) may be attached to the platform using the longitudinal grooves 15 in the frame 10. Depending upon the payload configuration it may be desirable to provide mounting rails 40 such as rails 41 and 42 shown in FIG. 3. The mounting rails are support beams attached to span the spaced apart members of the frame and attached to the grooves 15b in the upper surface of the frame 10. Whilst the example uses transversely aligned rails 40 for some payloads additional or alternative longitudinal beams could be provided.

The structural frame 10 defines an interior space which is bounded by the inward facing surfaces of the beams 11, 12, 13 and 14. The interior space is bounded top and bottom by the plane of the respective upper and lower surfaces of the beams 11, 12, 13 and 14. A central unit 30 is secured within the interior space (using the grooves on the internal faces of the beams) and has a generally planar configuration such that it conforms to the space. A protective top cover 31 and bottom covers (not visible but of substantially the same construction as the top cover) are provided to enclose the interior space. The covers can be sealed against ingress of water or debris and can be selected from a suitable material depending on the requirements of the platform (for example sheet metal or thermoplastic dependent on the application).

The central unit includes the power source, such as a battery module, a controller 100 and may also include a thermal management system (which may for example comprise a source of cooling air for the controller, power source and/or direct drive motor). The controller may include sensors (for example for position and orientation) and/or wireless communications links. The controller 100 may comprise a plurality of modules making up a complete control system. The size and shape of the central unit 30 is selected to match the interior dimensions of the frame 10. As the central unit is positioned within the frame 10, embodiments provide a rugged arrangement in which the systems within the unit 30 are well protected by the frame in an exoskeletal type manner. As the central unit 30 is substantially planar and fits between the planes of the upper and lower sides of the frame it will be appreciated that the mobile platform 1 can have a relatively low profile and may have high ground clearance compared to a conventional arrangement in which the systems are built on top of a supporting chassis.

Figure 3:
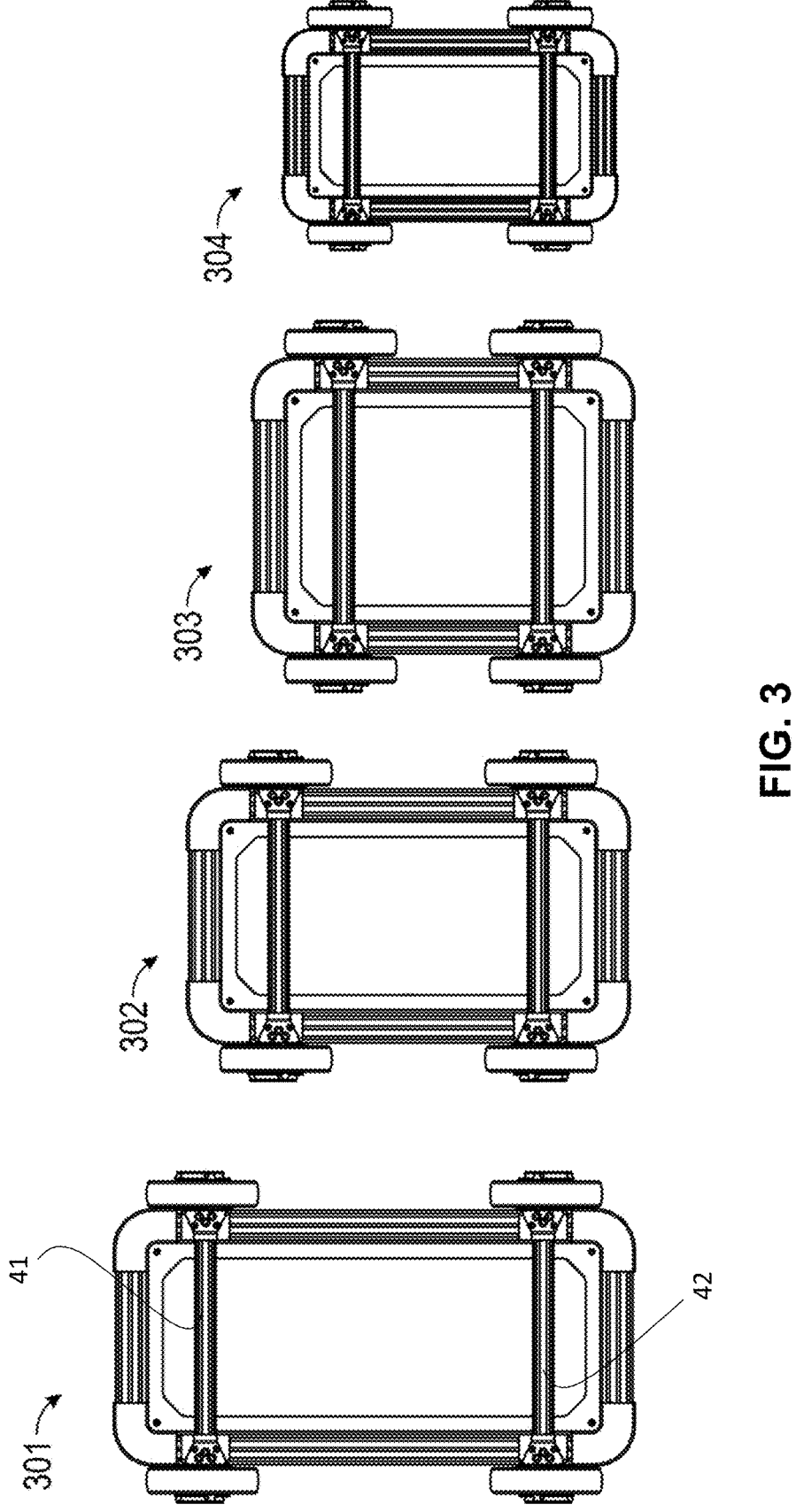
FIG. 3 shows plan views of a range of platforms constructed in accordance with an embodiment.
Figure 4:
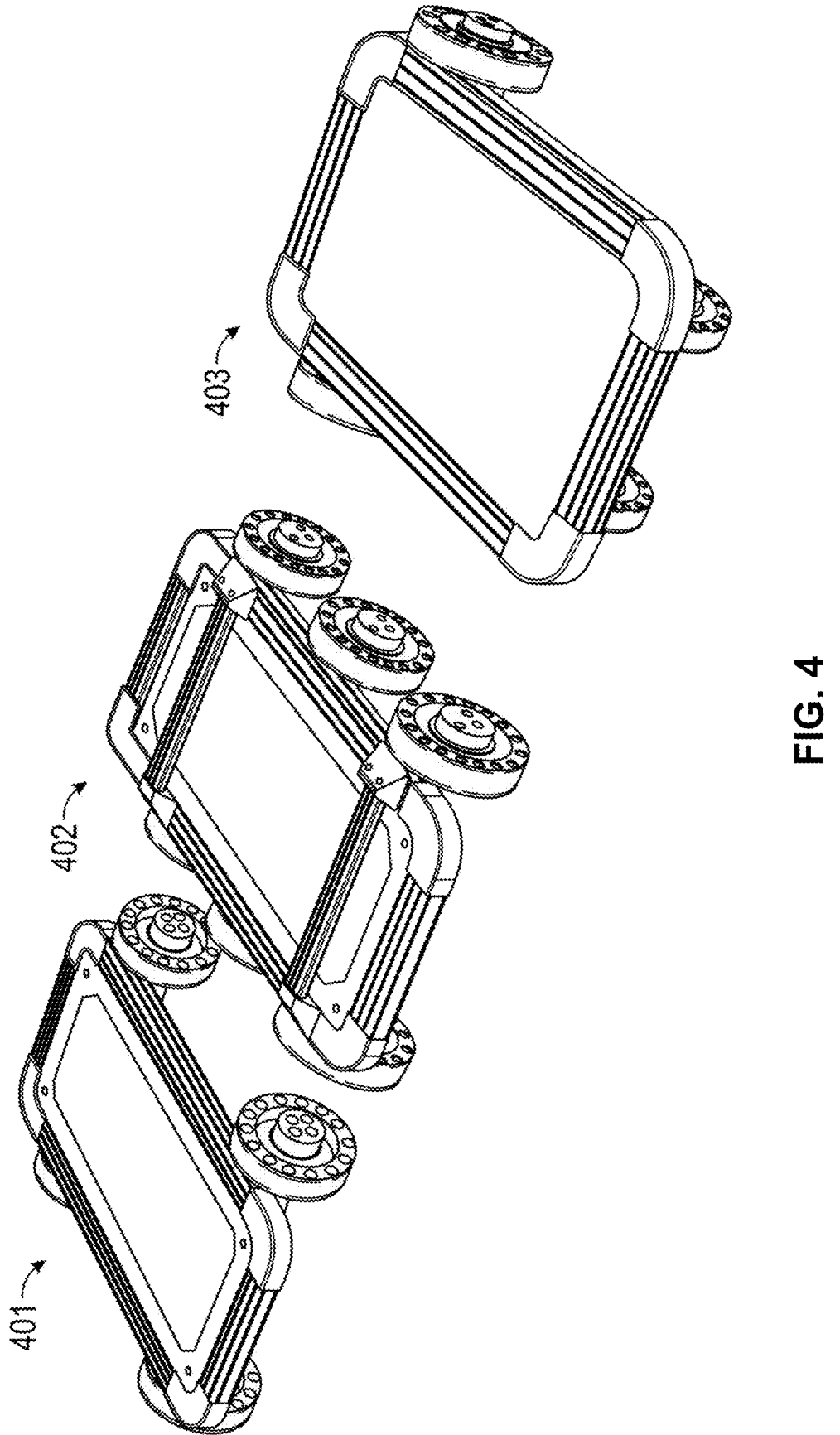
FIG. 4 shows examples of a variety of platforms in accordance with embodiments.

The flexibility provided by embodiments of the invention is illustrated in FIGS. 3 and 4. FIG. 4 shows an example of how platforms 301 to 304 can be formed using the same basic components of the system in a variety of size configurations. Each platform uses the same wheel set 20, a structural frame 10 (including mounting rails 40) and a common, but scaled, central unit 30. The method and apparatus of embodiments allows the user to specify required platform characteristics such as length and width and a corresponding platform to be rapidly provided with minimal development requirement. Once the platform dimensions have been specified a structural framework can be constructed and the central unit and wheel set connected directly to the framework. Likewise, as shown in FIG. 4, the utility of the platform can be maximised by selecting an appropriate wheelset for a given task. The wheel set is simply coupled to the frame work in the required locations and the platform can be rapidly provided. By using wheels with direct drive motors the total drive force provided by the platform can, for example, be scaled by selecting the number of such driven wheels provided. In the examples of FIG. 4, platform 401 has four wheels including motors, platform 402 has six wheels including motors and platform 403 includes two wheels including motors.

It may be appreciated that the system of embodiments includes several features which are specifically designed to enhance flexibility when configuring mobile platforms and which allow for different platform configurations to be assembled with a high degree of part commonality. One such feature is the use of multifunctional connectors 50. The multifunctional connectors 50a, 50b of embodiments integrate both a mechanical connector for connecting two adjacent beam sections 12a, 12b and 14a, 14b and electrical interfaces 51, 52, 53, 54, 55 for the platform. Advantageously, the provision of an integrated multifunctional connector increases the commonality of parts between different configurations of the mobile platform (such as those shown in FIG. 3 or 4) since the structural members 14a, 14b and 12a, 12b can be selected without the need to change other elements. Thus, it will be appreciated that the multifunctional connectors of embodiments may enable different configurations of mobile platform to be provided and/or reconfigured with the use of the same interface components.

It can be noted that the multifunctional connectors 50 are linear connectors between adjacent beam sections such that they are an intermediate location to one of the sides of the structural frame. Whilst the example shows the connectors 50 in a side section they may equally be positioned in the front or rear beam sections depending upon the configuration of the mobile platform. It will also be appreciated that the multifunctional connectors 50 could alternatively be integrated into the corner brackets 16—this would have the advantage of reducing overall part count but is also, generally, less convenient as angled connectors would have reduced space available for the electrical interfaces than a linear connector as shown in FIGS. 1 and 2.

The electrical interfaces integrated in the multifunctional connectors 50a and 50b provide user interfaces for central unit contained within the structural frame 10. As such, the multifunctional connectors conveniently reduce or remove the need for custom interfaces or opening to be provided through the frame 10 or protective top 31 or bottom covers. As shown in the embodiment of FIG. 1, the mobile platform 1 may include different types of multifunctional connector so as to enable different interfaces to be provided on each part of the platform. The first multifunctional connector 50a, for example, includes a display or indicator 51 (which may for example be an LCD or an array of diodes). The indicator 51 may provide a status indication and may include a battery charge level display. Additionally, the first multifunctional connector 50a includes a switch 52 which may for example be a power and/or mode selection dial. The second multifunctional connector 50b include a number of connector sockets 53, 54 and 55. The sockets may include connectors for power and/or data connections and may utilise standard connectors (for example USB and/or Ethernet connectors) for ease of connection/compatibility.

Figure 2B:
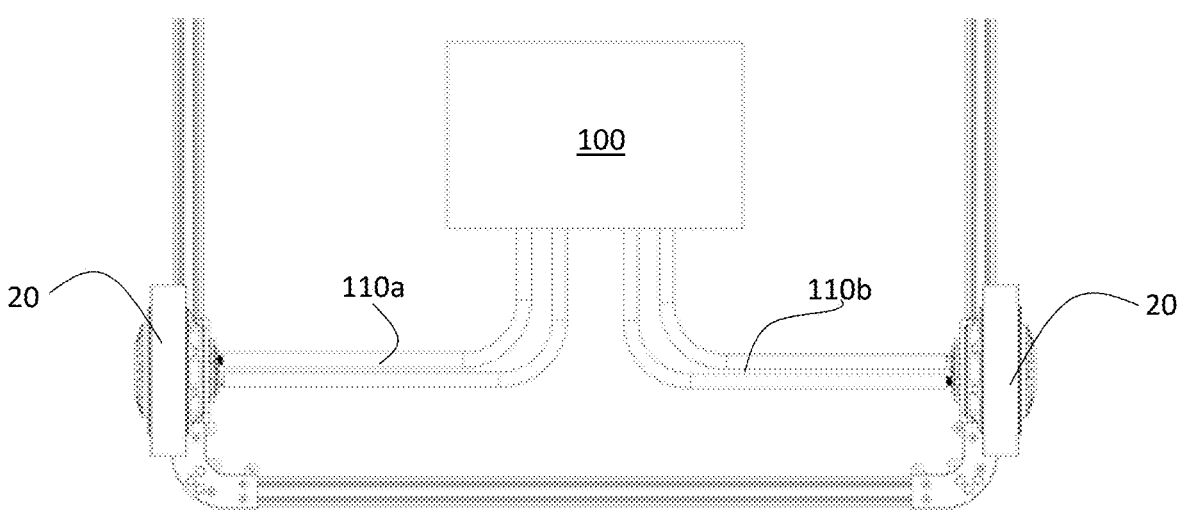

FIGS. 2A and 2B illustrate the use of a further feature which increases the flexibility and configurability of the mobile platform 1 of embodiments. As shown in FIG. 2A, the controller 100 of the mobile platform 1 is provided with a plurality of wiring harnesses 101, 102, 103 and 104 which provide the require connections to the internal side of the interfaces on the multifunctional connectors 50. As shown in FIG. 2B pre-configured harnesses 110a, 110b may also be provided to make connections between the controller 100 and the wheel units 20. The harnesses 110a include a connector interface at one end for connection to the controller 100 and a connector at the second end for connection to the in-hub motor of the wheel 20. The wheel assembly 20 may be provided with a panel mount connector on its rear (inwardly facing) side for receiving the connector of the harness 110. Advantageously, the use of a wiring harness with standard connectors enables increase part commonality such that wheels can, for example, be used interchangeably on any mobile platform and enables improved serviceability and repair.

FIG. 7 illustrates a schematic flow chart of a method of assembling a mobile platform for an autonomous mobile robot in accordance with embodiments. The method 600 generally comprises an initial selection phase in which the user specifies a chassis configuration (step 610) and a wheel configuration (step 620) which will generally be determined based upon the specification and use requirements for the mobile platform. To assist in this initial configuration a configurator may be provided which allows an end user to define and view possible configurations, for example over a web interface. The configurator may, for example, provide a three-dimensional CAD model of the mobile platform with pre-defined sub components (such as wheel units and frame members) selectable and configurable such that the user can preview potential configurations.

Once the configuration is chosen the mobile platform may be assembled in steps 630 to 650. The steps may comprise constructing a peripheral structural frame (step 630); and providing a central unit configured to conform to the internal form of the structural frame and having a substantially planar form (step 640). The central unit may comprise at least a power source and a controller and include upper and lower protective covers as described above. The method of assembly may then comprise the step 650 of mounting a wheel set to the frame. The wheel set may comprise a plurality of wheel units each coupled to the frame and at least one wheel including an in-hub electric motor.

Although the invention has been described above with reference to preferred embodiments, it will be appreciated that various changes or modifications may be made without departing from the scope of the invention as defined in the appended claims.

Whilst the examples above use simple wheels having a tyre mounted to the wheel hub some vehicles may use other wheel types or formats dependent upon the intended application. Accordingly, "wheel" in the context of the invention should be broadly interpreted. For example, embodiments could use wheels which power treads/tracks. Omniwheels could be used which are able to roll forward but have rollers that allow them to slide sideways so with a torque differential they allow the platform to yaw left/right. Some vehicle configurations could use at least four powered wheels configured as mecanum wheels which would enable the platform to move forward, backward, left or right and yaw through the use of differentiating wheel speeds between the rear and front set of wheels or left and right set of wheels. The skilled person may also appreciate that "wheels" may be used as power output means in marine thruster systems (for example in which the outer rotational portion of the "wheel" is replaced by, or carries, an impeller or propeller arrangement).

What is claimed is:

1. A mobile platform for an autonomous mobile robot, the platform comprising:

an external structural frame extending around a periphery of the platform;

a wheel set comprising a plurality of wheel units each coupled to the structural frame and at least one wheel including an in-hub electric motor; and a central unit configured to conform to an internal form of the structural frame and having a substantially planar form and the central unit comprising at least a power source and a controller, wherein the external structural frame comprises a closed shape extending around the periphery of the platform and defining an open central region into which the central unit is mounted, and wherein the external structural frame comprises:

a plurality of elongate beams, a plurality of connectors, each connector receiving and mechanically coupling adjacent ends of respective elongate beams, of the plurality of elongate beams; and at least one of the plurality of connectors being a multifunctional connector which further comprises one or more integrated electrical interfaces for the central unit, wherein the elongate beams are sections having a constant cross section, and wherein the elongate beams are each formed with at least one longitudinal groove formed in a surface of the beam and extending longitudinally along a length of the beam.

2. The mobile platform of claim 1, wherein the wheel comprises a direct drive motor.

3. The mobile platform of claim 1, wherein the central unit comprises upper and lower cover plates and wherein the cover plates and the structural frame form a sealed unit.

4. The mobile platform of claim 3, wherein at least one of the cover plates is planar and parallel to a surface of the external structural frame.

5. The mobile platform of claim 1, wherein the central unit is configured such that it is volumetrically confined within a space defined by the structural frame.

6. The mobile platform of claim 1, wherein each wheel unit is connected to the structural frame via at least one longitudinal groove.

7. The mobile platform of claim 1, wherein the longitudinal grooves provide mounting rails for an autonomous mobile robot payload.

8. The mobile platform of claim 7, further comprising elongate payload support beams mounted to the structural frame and extending transversely across the central unit.

9. The mobile platform of claim 1, wherein the controller comprises a centralised control providing centralised communication across all functional units.

10. The mobile platform of claim 9, further comprising a centralised electrical and electronics system connected to the controller, and a plurality of optional modules which are connectable to the controller via the centralised electrical and electronics system.

11. A modular system comprising a plurality of mobile platforms each in accordance with claim 1, wherein each mobile platform is configured by selecting a size for the structural frame and assembling the central unit within a size constraint of the structural frame.

12. A method of assembling a mobile platform for an autonomous mobile robot, the method comprising the steps of:

constructing a structural frame;

providing a central unit configured to conform to an internal form of the structural frame and having a substantially planar form, the central unit comprising a power source and a controller; and mounting a wheel set to the structural frame the wheel set comprising a plurality of wheel units each coupled to the structural frame and at least one wheel including an in-hub electric motor, wherein the structural frame comprises a closed shape extending around a periphery of the platform and defining an open central region into which the central unit is mounted, and wherein the structural frame comprises:

a plurality of elongate beams, a plurality of connectors, each connector receiving and mechanically coupling adjacent ends of respective elongate beams, of the plurality of elongate beams; and at least one of the plurality of connectors being a multifunctional connector which further comprises one or more integrated electrical interfaces for the central unit, wherein the elongate beams are sections having a constant cross section, and wherein the elongate beams are each formed with at least one longitudinal groove formed in a surface of the beam and extending longitudinally along a length of the beam.

13. The method of claim 12, wherein the step of providing a central unit comprises providing a pair of spaced apart upper and lower covers enclosing an internal space within the structural frame.

\* \* \* \* \*